(12) United States Patent
Duclos et al.

(10) Patent No.: US 8,517,710 B2
(45) Date of Patent: *Aug. 27, 2013

(54) MACHINE FOR THE MANUFACTURE OF CONTAINERS, COMPRISING A MODULE FOR CONTROLLING THE DEVICES OF A MOULDING UNIT SO AS TO EFFECT A CHANGE OF MOULD

(75) Inventors: Yves-Alban Duclos, Octeville sur Mer (FR); Stéphane Hazard, Octeville sur Mer (FR); Fabrice Burel, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 492 days.

This patent is subject to a terminal disclaimer.

(21) Appl. No.: 12/856,743

(22) Filed: Aug. 16, 2010

(65) Prior Publication Data

US 2011/0059197 A1   Mar. 10, 2011

(30) Foreign Application Priority Data

Sep. 8, 2009   (FR) ..................... 09 56111

(51) Int. Cl.
*B29C 49/56*   (2006.01)
*B29C 49/28*   (2006.01)
*B29C 49/78*   (2006.01)

(52) U.S. Cl.
USPC ........ 425/150; 425/541; 425/451.4; 264/538; 264/542; 264/543; 264/297.8

(58) Field of Classification Search
USPC ........ 425/540, 541, DIG. 4, 451.4; 264/538, 264/542, 543, 297.5–297.8
See application file for complete search history.

(56) References Cited

U.S. PATENT DOCUMENTS

| | | | |
|---|---|---|---|
| 5,968,560 A | 10/1999 | Briere et al. | |
| 6,464,486 B1 | 10/2002 | Barray et al. | |
| 7,249,944 B2 | 7/2007 | Arakelyan et al. | |
| 2006/0099294 A1* | 5/2006 | Netsu | 425/540 |
| 2007/0286920 A1* | 12/2007 | Netsu | 425/526 |
| 2009/0136613 A1* | 5/2009 | Linke et al. | 425/541 |
| 2009/0178264 A1 | 7/2009 | Stoiber | |
| 2010/0109207 A1* | 5/2010 | Rousseau et al. | 264/535 |
| 2011/0260373 A1* | 10/2011 | Finger et al. | 264/532 |
| 2012/0148703 A1* | 6/2012 | Duclos | 425/214 |
| 2012/0251648 A1* | 10/2012 | Duclos et al. | 425/150 |
| 2012/0286455 A1* | 11/2012 | Weiss | 264/523 |

FOREIGN PATENT DOCUMENTS

| | | |
|---|---|---|
| EP | 0 821 641 B1 | 8/2000 |
| EP | 2 080 606 A2 | 7/2009 |
| FR | 2 646 802 A1 | 11/1990 |
| FR | 2 764 544 A1 | 12/1998 |
| FR | 2 843 714 A1 | 2/2004 |

OTHER PUBLICATIONS

French Search Report, dated Apr. 22, 2010, from corresponding French application.

* cited by examiner

*Primary Examiner* — Joseph S Del Sole
*Assistant Examiner* — Nahida Sultana
(74) *Attorney, Agent, or Firm* — Young & Thompson

(57) ABSTRACT

A machine for the manufacture of containers made of thermoplastic, includes at least one molding unit selectively associated with a control module (70) able, in the use state, selectively using a first actuating device (76) to control the locking device and using a second actuating device (78) to control the opening/closing device with which the molding unit is respectively equipped.

13 Claims, 10 Drawing Sheets

MACHINE FOR THE MANUFACTURE OF CONTAINERS, COMPRISING A MODULE FOR CONTROLLING THE DEVICES OF A MOULDING UNIT SO AS TO EFFECT A CHANGE OF MOULD

The present invention relates to a machine for the manufacture of containers, comprising a module for controlling the devices of a moulding unit so as to effect a change of mould.

Such container manufacturing machines, notably although not exclusively machines known as "rotary" machines, are known from the prior art.

FIG. 1 depicts an installation 5 comprising a container manufacturing machine 10 according to the prior art, in which the machine 10 (also known as the "blow moulding unit") is associated with an oven 12 for the thermal conditioning of the preforms 14.

The installation 5 comprises a feed device 16 for preforms 14 (or parisons) which are introduced into the installation via an entrance E which communicates with an entrance zone of the oven 12.

The oven 12 comprises preform 14 heating means 18 which are arranged along all or part of a U-shaped path stretching from the entrance zone of the oven to which zone the preforms 14 are brought by the feed device 16 to an exit zone of the oven 12, near which zone a first transfer device 20 is positioned.

The first transfer device 20 is intended to transfer the thermally conditioned preforms 14 from the exit zone of the oven 12 to a zone Z1, known as the introduction zone, where the preforms 14 are introduced into the manufacturing machine 10.

The manufacturing machine 10 comprises a carousel 22 equipped with a series of circumferentially distributed moulding units 24 and associated blow-moulding or stretch-blow-moulding means (not depicted).

A moulding unit 24 generally comprises two mould holders 26 which are mounted so that they can move between an open position and a closed position, for example mounted so that they can rotate one with respect to the other, and a mould comprising at least two moulding elements each fixed removably to an associated mould holder 26.

The manufacturing machine 10 is able to operate in different modes of operation.

According to a first mode of operation of the machine, known as the production mode, the machine 10 is used in conjunction with the oven 12 of the installation 5 to manufacture containers.

In such a mode of operation of the machine 10, the carousel 22 is turned so that each moulding unit 24 travels a transformation cycle from the said introduction zone Z1 to a zone Z2, known as the container 14' discharge zone, in which a second transfer device 28 is positioned.

The second transfer device 28 is intended to transfer the containers 14', obtained from the preforms 14, from the discharge zone Z2 of the machine 10 to an exit S of the installation 5.

As illustrated in FIG. 1, the preform 14 introduction zone and the container 14' discharge zone are adjacent and situated in the front part of the machine 10 so that the transformation cycle is performed over practically the entire circumference of the machine.

The installation 5 generally comprises a protective enclosure 30 forming a box arranged in such a way as to surround at least the manufacturing machine 10 and the oven 12.

When the machine 10 illustrated in FIG. 1 is in production mode, plastic containers such as bottles, vials etc. are manufactured by blow-moulding or by stretch-blow-moulding, in the moulding units 24, preforms 14 that have previously been heated in the thermal conditioning oven 12.

However, while the production mode is the main mode of operation of the machine, the machine 10 does also have another mode of operation, known as the intervention mode, which is just as important.

This is because the said at least two moulding elements that form the mould and therefore each comprise a half cavity are fixed to the mould holders 26 by a fixing means (not depicted) capable of allowing them to be removed so that the mould can be changed.

Document EP-B1-0.821.641 in the name of the applicant company notably describes various improvements made both to the structure of a moulding unit and of the mould it comprises and to the mould fixing means and reference may advantageously be made to this document, which has been cited merely by way of example.

Such a mould change is required in particular in order to manufacture containers of different shapes and/or sizes or alternatively in order to replace these moulds if the moulding elements become damaged and/or worn.

The mode of operation known as the intervention mode, during which the production of containers by the machine is halted, is performed more or less frequently according to the way in which the machine 10 is used.

In some instances, mould changes are very frequent which means that even greater attention has to be devoted to the time taken to change the mould of a moulding unit.

The reason for this is that the time taken to perform a mould change has to be multiplied by the number of moulding units 24 that the machine 10 comprises, which number for example can range between 16 and 30 moulding units.

The operations required in changing the mould of a moulding unit are numerous and performed manually by an operator, sometimes by two operators, which means that the users often consider the intervention time to be too long.

Now, the machine downtime during which the machine 10 is unavailable during these operations represents a significant cost because of the accompanying complete production shutdown which means that the mould change operations, the frequency of which varies with the user, are consequently expensive because they are lengthy and complex.

What is more, the mould change operations are tiring for the operator and are carried out in an environment of little ergonomic merit.

It is a particular objective of the present invention to address the aforementioned disadvantages and the invention is aimed quite particularly at reducing the time needed to change the mould of a moulding unit while at the same time improving the general intervention mode conditions of the machine, both from a safety and from an ergonomic perspective.

To this end, the invention proposes a machine for the manufacture of containers, notably bottles, made of thermoplastic, comprising at least one moulding unit which comprises:

at least two mould holders mounted such that they can move between an open position and a closed position, and a mould comprising at least two moulding elements each fixed removably to an associated mould holder by fixing means, the said moulding unit comprising:

a moulding unit opening/closing device comprising a control member for moving the mould holders between the said open and closed positions;

a moulding unit locking device comprising a control member for controlling the locking means which are able to move between:

a locked position in which the mould holders of the moulding unit are kept in a closed position by the said locking means, and an unlocked position in which the mould holders are free to be parted from the closed position to the open position.

According to the invention, the machine for the manufacture of containers of the type described previously is characterized in that the machine comprises a control module able to occupy at least:

a standby state associated with one mode of operation of the machine, known as the production mode, in which the machine manufactures containers, and a state of use associated with another mode of operation of the machine, known as the intervention mode, in which at least the mould of the moulding unit can be changed, and able selectively to control the moulding unit locking device and opening/closing device according to the state occupied by the module, the said module comprising at least:

a first device intended selectively to actuate the moulding unit locking device and mounted able to move between:

a rest position occupied when the module is in the standby state, and a work position occupied when the module is in the state of use and in which the first device is able to collaborate with the locking device control member under the action of means causing relative movement between the module and the machine, a second device intended selectively to actuate the moulding unit opening/closing device control member and which is mounted such that it can move between:

a rest position occupied when the module is in the standby state, and a work position occupied when the module is in the service state and in which the second device is able to collaborate with the opening/closing device control member under the action of means causing relative movement between the module and the machine, and a chassis supporting said first and second devices of the module.

Advantageously, the control module according to the invention makes it possible to dispense with any manual intervention on the part of an operator in order to unlock and open the moulding unit in order to change the mould of the said unit.

Thus, these first steps of the method of changing the mould of a moulding unit are of shorter duration.

Advantageously, the cam of the second device is able to open the mould holders of the moulding unit as wide as they will go to facilitate access to the moulding elements and to their fixing means thus improving the ergonomics of the subsequent removal and fitting operations.

According to other features of the invention:

the means of relative movement consist of the moulding unit which can be moved with respect to the fixed module along a travel capable of bringing each control member into collaboration with the associated device occupying its work position until a set position, known as the mould change position, is reached;

the first device of the module comprises at least one actuator selectively controlling the movement of at least one cam between the said rest and work positions, the said cam collaborating with the locking device control member to cause the locking means to move between the said locked and unlocked positions;

the cam of the first device of the module is mounted such that it is able to move rotationally or translationally between the said rest and work positions;

the locking device control cam comprises a cam profile that has at least one unlocking section to cause the locking means to move into the unlocked position;

the locking device comprises elastic return means able automatically to return the locking means to the locked position;

the moulding unit comprises a blocking mechanism associated with the locking device, the said mechanism comprising blocking means able selectively to be made to move between an inactive position and an active blocking position in which the said blocking means immobilize the locking means in the unlocked position;

the blocking mechanism comprises an elastic return member for elastically returning the blocking means to the active position, and the blocking means are moved, against the action of the said elastic return member, from the active position to the inactive position by a control element which, connected with one of the mould holders, is able to collaborate with the blocking means in such a way as automatically to cause unblocking upon closure of the mould holders of the moulding unit;

the second device of the module comprises at least one actuator selectively controlling the movement of at least one cam between the said rest and work positions, the said cam collaborating with the unit opening/closing device control member to cause the mould holders to move between the said open and closed positions;

the cam of the second device is mounted such that it can move translationally or rotationally between the said rest and work positions;

the opening and closing device control cam comprises a cam profile having at least one section controlling the opening and one section controlling the closing of the unit mould holders;

the actuators of the first device and of the second device constitute means for controlling the change of state of the module between the standby and use states;

the machine of rotary type comprises a carousel circumferentially provided with a series of uniformly angularly distributed moulding units, each of the units travelling a circular overall path from a preform introduction zone to a container discharge zone, the zones being situated respectively in a front part of the machine, and the module is arranged in a rear part of the machine which is diametrically opposite the said front part.

Further features and advantages of the present invention will become apparent from reading the detailed description which follows, for the understanding of which reference will be made to the drawings in which.

In the remainder of the description, the longitudinal, vertical and transverse orientations adopted will be those with reference to the trihedron (L, V, T) depicted in the figures.

By convention, the longitudinal and transverse directions are determined fixedly with respect to the mould holders so that the open or closed position occupied has no impact on the said orientations.

Also, the terms "front" and "rear" will be used nonlimitingly with reference to the longitudinal orientation, and "upper" and "lower" will be used nonlimitingly with reference to the vertical orientation, while finally "left" or "right" and "inner" or "outer" will be used nonlimitingly with reference to the transverse orientation.

Figure 1:
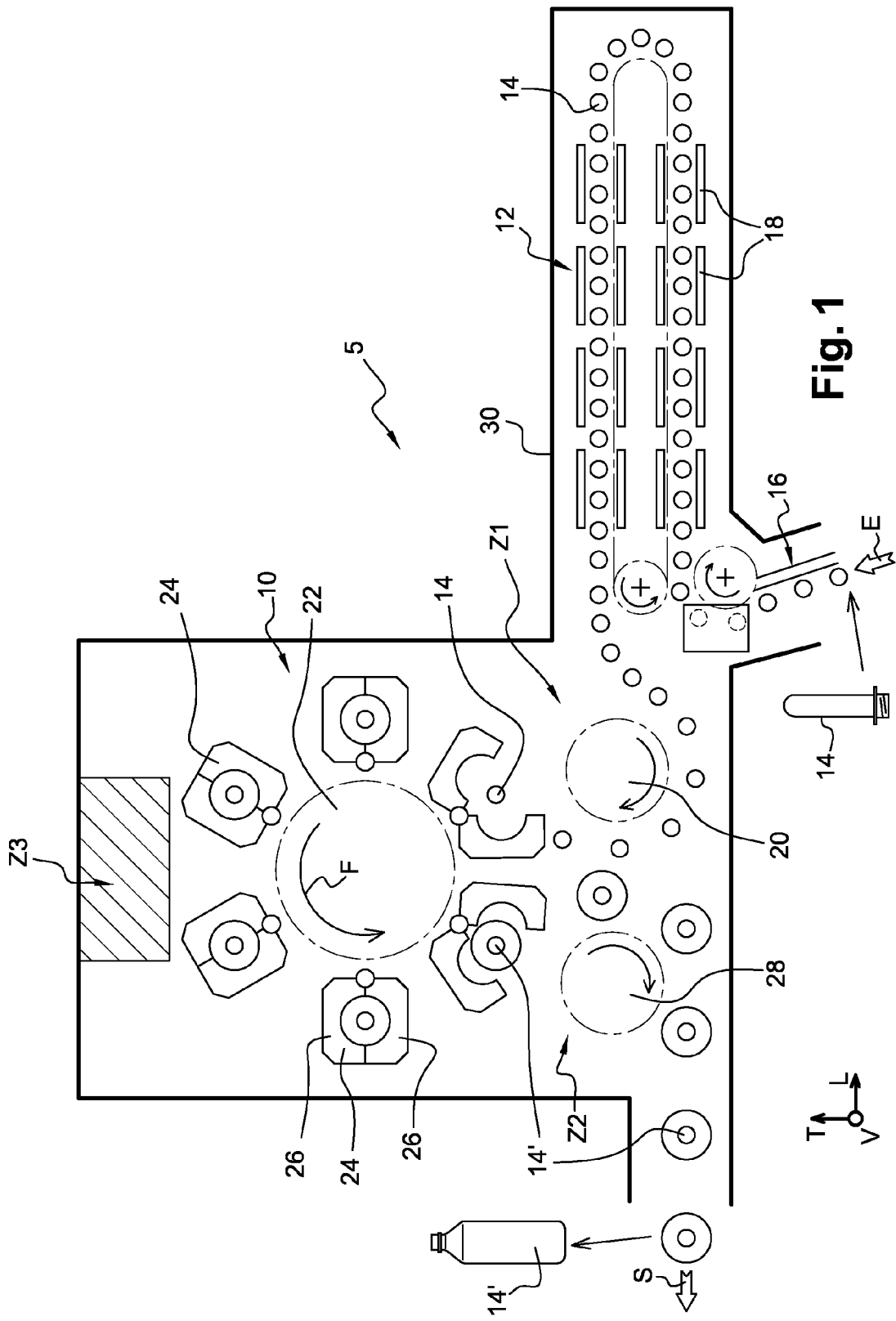
FIG. 1 is a plan view schematically depicting an installation comprising one embodiment of a machine for the manufacture of containers according to the prior art.
Figure 2:
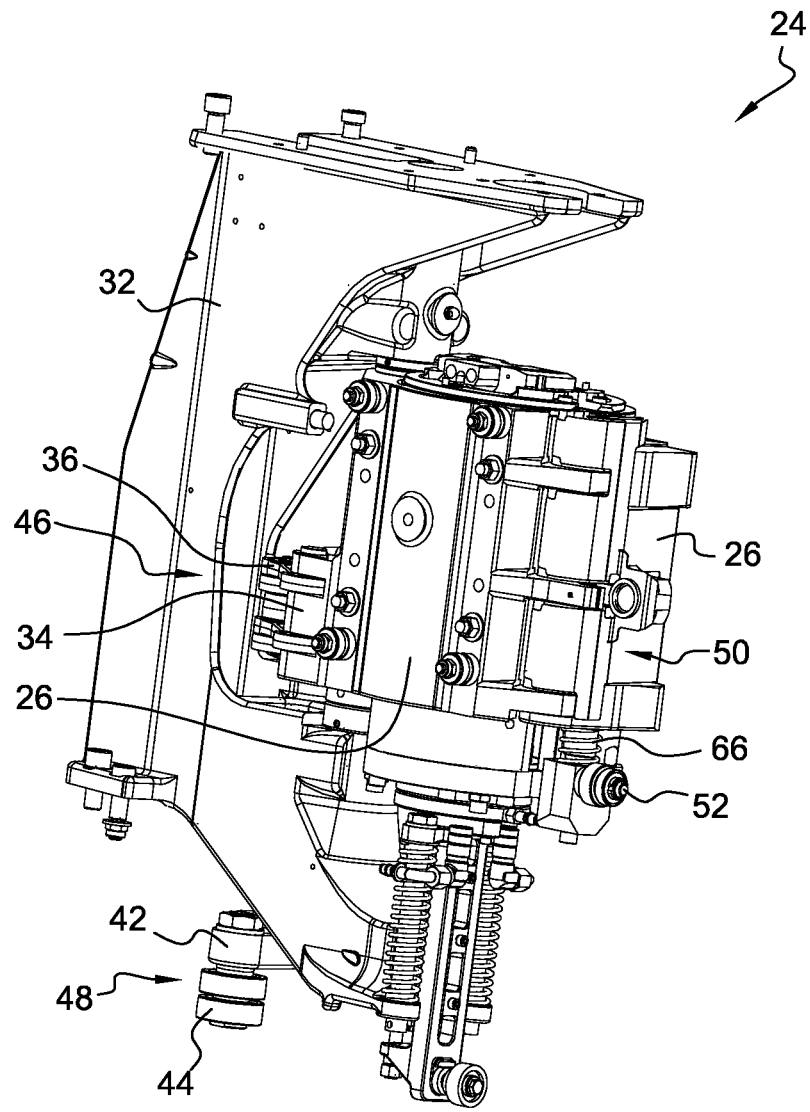
FIGS. 2 and 3 are perspective views depicting a moulding unit that can be fitted to one of the work stations of a machine according FIG. 1, the said unit being illustrated in a three quarters front view in the closed position, and in a side view in the open position, respectively.
Figure 3:
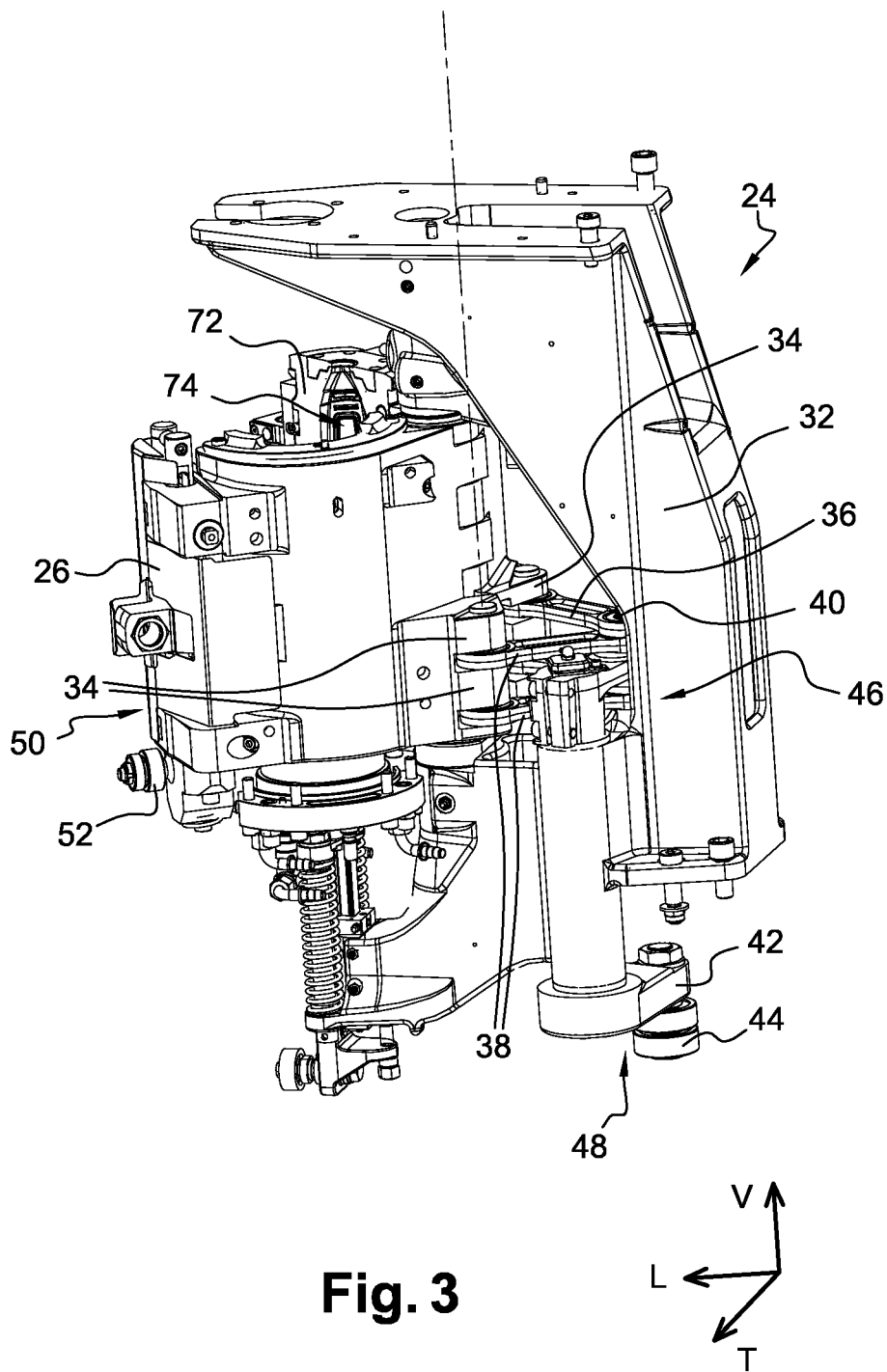

FIGS. 2 and 3 depict one embodiment of a moulding unit 24 that can be mounted on a carousel 22 of a container manufacturing machine 10 of the type depicted in FIG. 1 and described in the preamble in conjunction with the modes of operation of the machine 10.

Such a moulding unit 24 therefore constitutes one of the blow-moulding or stretch-blow-moulding stations of the machine 10 which comprises a series of "n" moulding units 24 uniformly angularly distributed about the carousel 22 of the machine 10.

For further details regarding the blow-moulding or stretch-blow-moulding means mentioned hereinabove, also sometimes referred to as and produced in the form of a blow pipe, reference may, for example, be made to document FR-2.764.544.

The moulding unit 24 comprises two mould holders 26 which are able to move one with respect to the other between an open position (FIG. 3) and a closed position (FIG. 2) and is supported by a bracket 32 intended to be fixed to the framework of the machine 10.

More specifically, the mould holders 26 are constructed in the form of two bearing structures mounted such that they can pivot about an axis O of rotation, the axis O of rotation here running vertically according to the (L, V, T) trihedral frame of reference.

As an alternative, just one of the mould holders 26 is mounted such that it can move while the other mould holder 26 is fixed, the moving mould holder 26 being made to move between the said open or closed positions.

Each mould holder 26 comprises pivot means arranged at the rear in the longitudinal direction.

For preference, the mould holder 26 pivot means comprise external lugs 34 which, space away from the axis of rotation O, are fitted respectively to each mould holder 26.

Mounted pivotably on the lugs 34 of each mould holder 26 are one of the ends of link rods, respectively of at least one link rod 36 for the left mould holder 26 and at least one link rod 38 for the right mould holder 26.

The other end of each of the link rods 36, 38 is connected with freedom to pivot on a common pivot pin 40 which is arranged longitudinally to the rear of the moulding unit 24.

When the common pivot pin 40 is moved approximately linearly in a direction, in this instance a longitudinal direction, it brings it closer to the axis O of rotation, the mould holders 26 are made to move closer together, thus closing the moulding unit 24, whereas if the common pivot pin 40 is moved away from the axis of rotation O, the mould holders 26 are moved further apart thus causing opening.

The mould holders 26 are thus able to move away from one another by pivoting about the axis O of rotation respectively between at least a closed position (FIG. 2) and an open position (FIG. 3).

Because of the dynamics of the mould holders 26, a moulding unit 24 of this type is also known as a "book-like opening" mould.

To control this movement of the common pivot pin 40, use is made of cam and roller drive means. For preference, the cam and roller drive means comprise lever means interposed between the cam and the roller to amplify the travel.

According to the exemplary embodiment, the common pivot pin 40 is secured to the end of a control arm 42 that acts as a lever and the free other end of which supports follower means which, formed of at least one roller 44, are able to collaborate with guide means such as a cam.

The pivot means and the associated drive means constitute a device 46 for opening/closing the moulding unit 24 comprising a control member 48 formed by the arm 42 and the roller 44 which is able to cause the mould holders 26 to move between the open and closed positions.

By way of an exemplary embodiment, reference will be made for example to document FR-A1-2.843.714 which in particular relates to control means of this type for controlling the opening/closing of a similar moulding unit.

The moulding unit 24 comprises a unit locking device 50 comprising a mould holder 26 locking means 54 control member 52.

The locking device 50 is arranged longitudinally in the front part, namely opposite the axis O of rotation and the moulding unit 24 opening/closing device 46 means and is intended to lock the two mould holders 26 in the closed position.

The locking device 50 for example comprises two half-locks of the male and female type respectively which are associated with the mould holders 26 and able to collaborate with one another to keep the moulding unit 24 in the closed position by locking the closure.

Thus, the particular function of the locking device 50 is to prevent, in production mode, any inadvertent opening during transformation operations employing blow-moulding or stretch-blow-moulding. By way of indication, it will be recalled that the final blow-moulding pressures may be as high as 40 bar.

Figure 7:
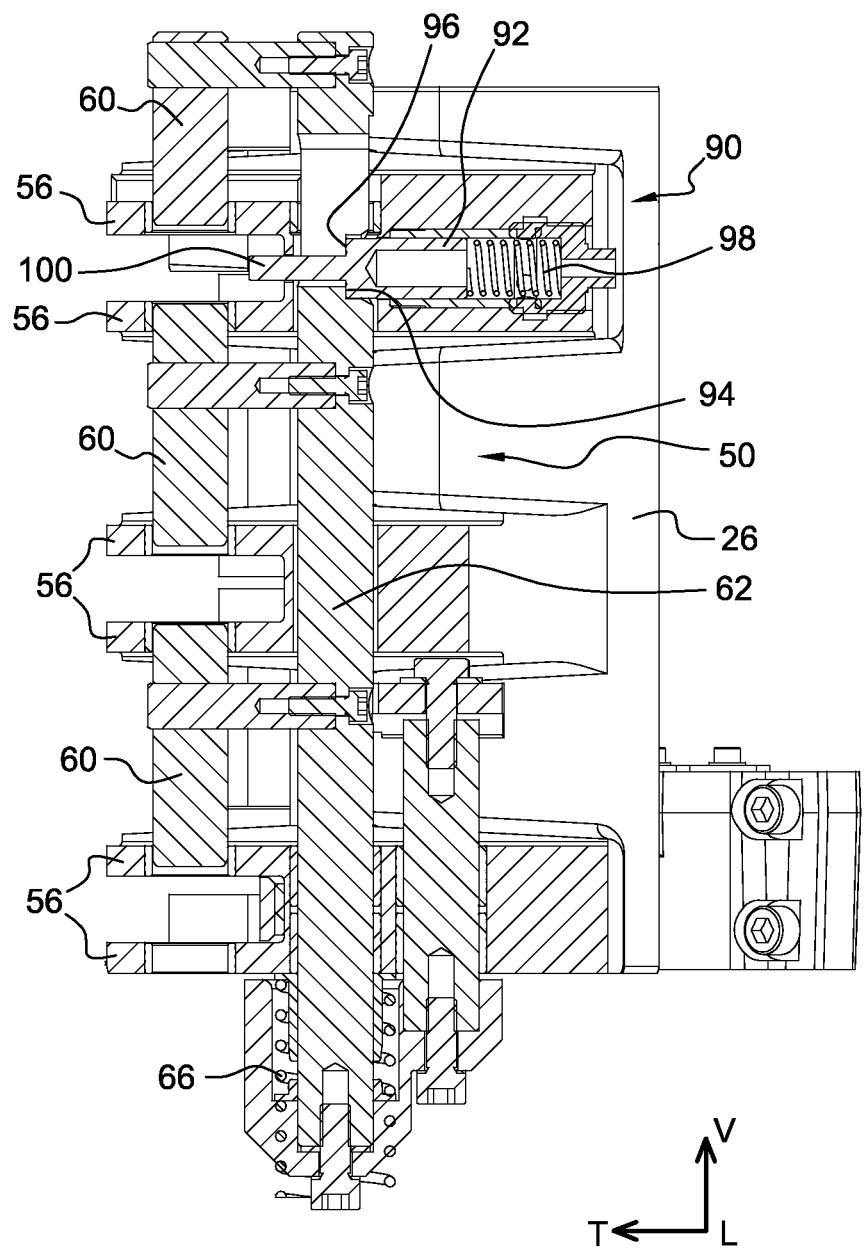
FIGS. 7 and 8 are cross sections depicting one embodiment of a moulding unit locking device and respectively illustrating the blocking mechanism associated with the said locking device in the active and inactive positions.
Figure 8:
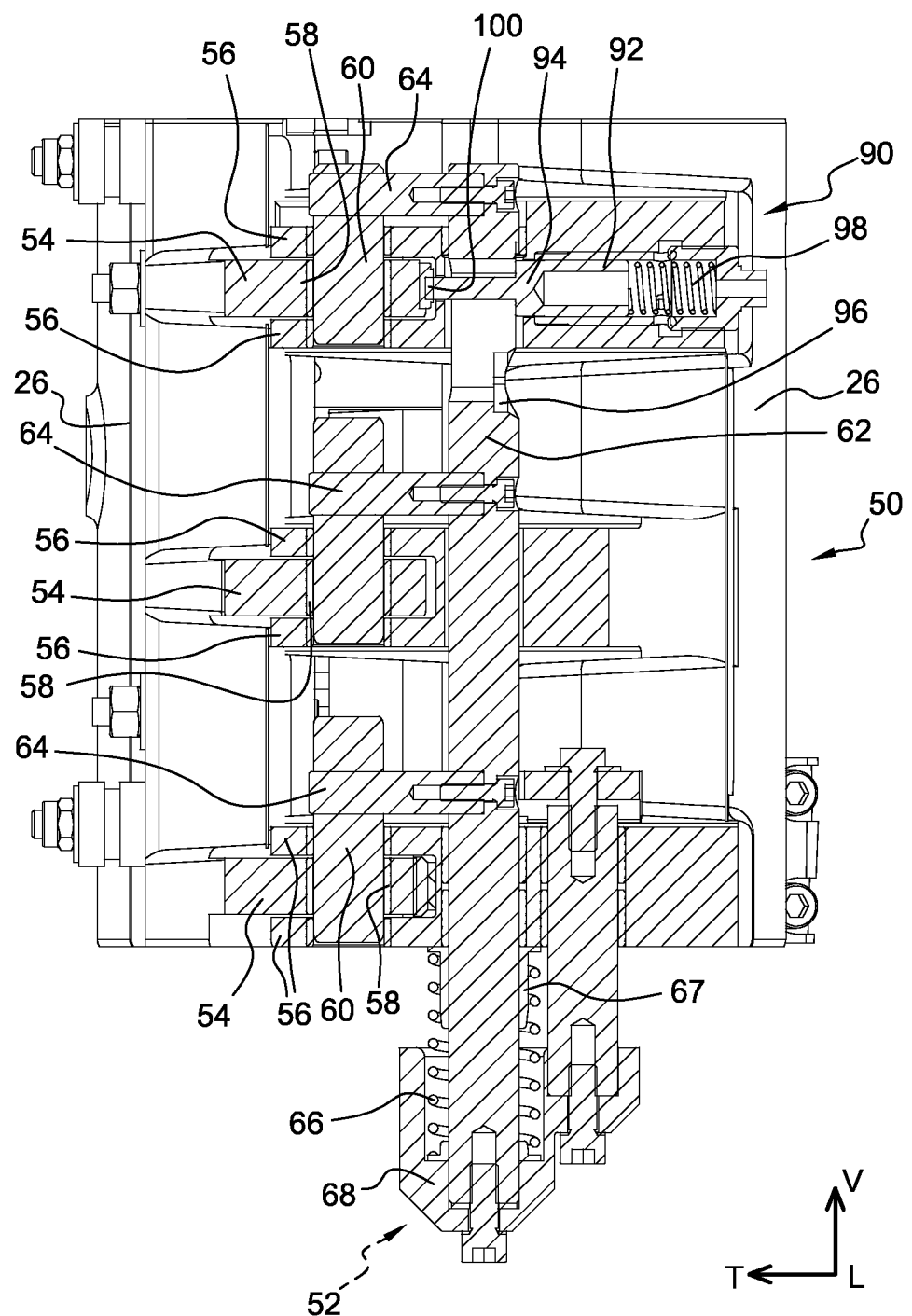

The locking device 50 is more particularly depicted in detail in the cross sections of FIGS. 7 and 8.

The half-locks each comprise at least one projecting branch, preferably here simple branches 54 for the half-lock of the left mould holder 26 and double branches 56 for the half-lock of the right mould holder 26.

The respective branches 54, 56 of the half-locks are directed transversely towards one another and are vertically offset from one another so that, in the closed position as illustrated in FIG. 8, the branches become interlaced.

Thus, each branch 54 is housed between the two branches 56 lying vertically above and below it.

For preference, each branch 54 of the female-type half-lock has an opening 58 which, running along a vertical axis, passes through the said branch 54 and each branch 56 of the male-type half-lock is able to support, in sliding in the vertical direction, a locking finger 60.

The locking device 50 comprises drive means 62 which are connected in terms of movement, here in terms of sliding movement, to the locking fingers 60 that form the locking means mounted such that they can move between a locked position and an unlocked position.

Advantageously, each locking finger 60 is secured to a connecting arm 64 which is itself secured in terms of movement to the drive means 62.

The sliding of the drive means 62 between the locked position (lowered position) and the unlocked position (raised position) is controlled by the control member 52 preferably formed of a roller secured to the drive means 62, such as a shaft.

Thus, the moulding unit 24 locking device 50 comprises a member 52 that controls the locking means 58, 60 which are able to move between:
- a locked position in which the mould holders 26 of the moulding unit 24 are kept in the closed position by the said locking means 58, 60, and
- an unlocked position in which the mould holders 26 are free to be parted from the closed position into the open position.

The control member 52 consisting of the roller is intended to collaborate with complementary cam means to control the is locking device 50 between the said locked and unlocked positions.

Advantageously, the locking device 5 comprises elastic return means 66 which are able automatically to return the locking means 58, 60 the locked position.

For preference, the means 66 are formed of an elastic return spring through the centre of which there runs the shaft that forms the drive means 62 and which rests at one of its ends against a cup 67 and at its other end against a support 68 fixed to the drive means 62 and carrying the control member 52.

For further details regarding the structure and operation of such a locking device 50, reference may, for example, be made to document FR-2.646.802 which describes a lock of similar overall design.

According to the invention, the machine 10 for the manufacture of containers comprises a control module.

Advantageously, the control module 70 according to the invention is able to occupy at least:
- a standby state associated with one mode of operation of the machine 10, known as the production mode, in which the machine manufactures containers, and a state of use associated with another mode of operation of the machine 10, known as the intervention mode, in which at least the mould of the moulding unit 24 can be changed.

Specifically, as has been depicted in FIG. 3 that illustrates the moulding unit 24 in the open position, the moulding unit 24 comprises a mould 72 comprising at least two moulding elements each equipped with a half-cavity 74 (visible in the half-mould present and in the position in which it is fixed to the mould holder 26).

However, when the container that is to be manufactured has a bottom of complex shape, particularly a petaloid bottom, it is a known fact that mould release problems are then liable to occur.

This is why a separate mould bottom is advantageously provided. Thus, the mould 72 comprises three separate elements respectively, namely two moulding elements and a bottom piece (not visible) comprising a cavity for the bottom of the container which complements the half-cavities 74 that the two moulding elements comprise.

As an alternative, the mould 72 could have no such bottom piece and then be produced solely as two moulding elements then conventionally known as half-moulds.

In addition, irrespective of whether the mould 72 is produced in two or three elements with a bottom piece, the design of the two moulding elements may also differ, notably if—in addition to bearing part of the cavity—the moulding element also incorporates other functions such as cooling.

For preference, the moulding elements of the mould 72 are identical in design to the one described in the aforementioned document EP-B1-0.821.641.

In that document, each of the two moulding elements is produced as two distinct parts, respectively, and according to the terms used in that document: a shell comprising part of the cavity and a shell holder which, intended to be mounted on a mould holder, has a housing in which the shell is accommodated and fixed using fixing means.

Advantageously, the control module 70 is able selectively to control the moulding unit 24 locking device 50 and opening/closing device 46 according to the state occupied by the control module 70.

One embodiment of such a module 70 for controlling the moulding unit 24 locking device 50 and opening/closing device 46 and which is more particularly depicted in FIGS. 4 to 6 will now be described.

Advantageously, the module 70 comprises a first device 76 which is intended selectively to actuate the moulding unit 24 locking device 50.

Advantageously, the module 70 comprises a second device 78 intended selectively to actuate the moulding unit 24 opening/closing device 46 control member 52.

For preference, the module 70 comprises a chassis 80 which respectively supports the first device 76 and the second device 78.

The first device 76 of the module 70 is mounted such that it can move between:
- a rest position (FIG. 4) that it occupies when the module 70 is in the standby state, and
- a work position (FIG. 5) that it occupies when the module 70 is in the use state.

Figure 5:
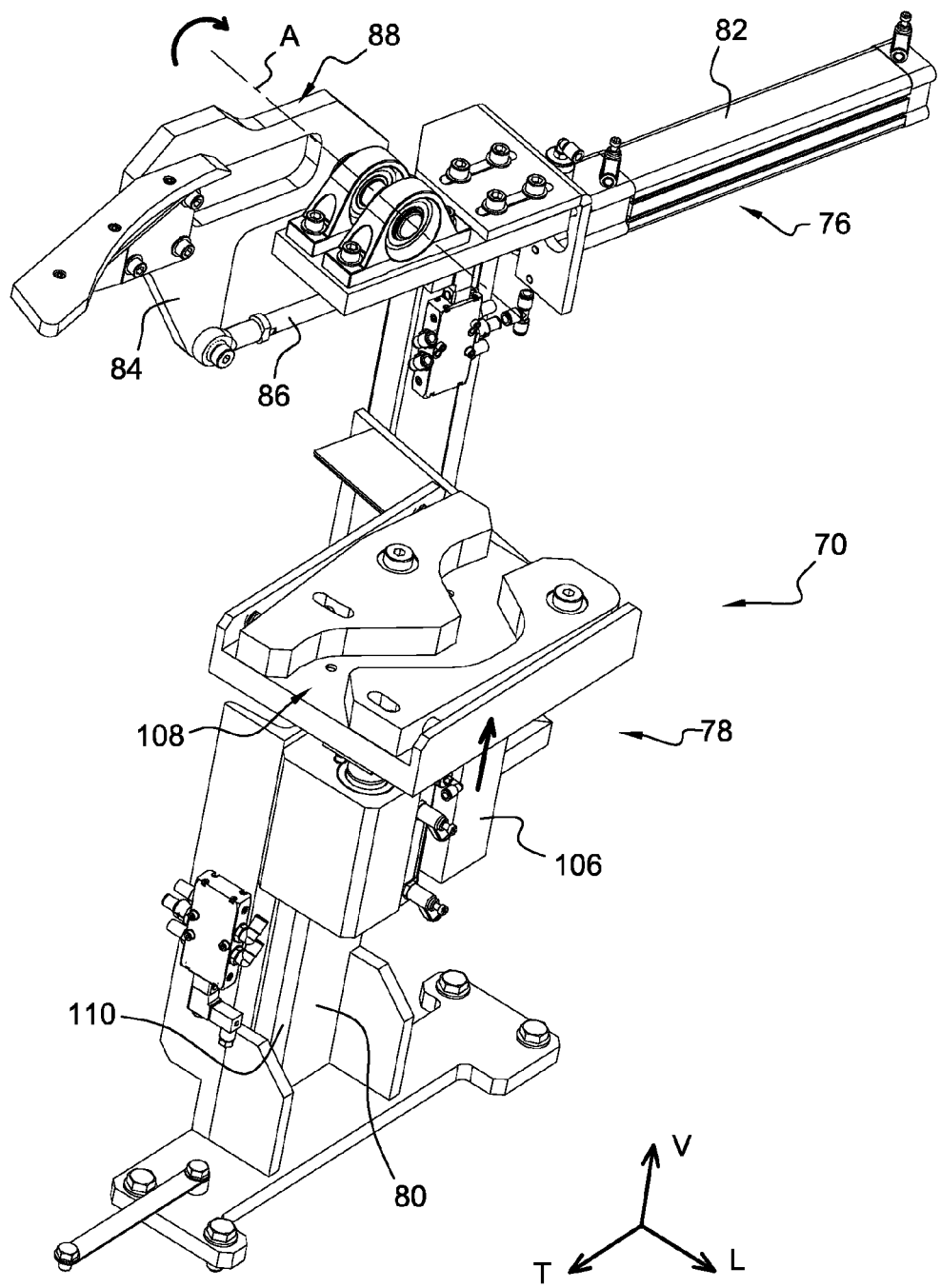

In the work position illustrated in FIG. 5, the first device 76 is able to collaborate with the locking device 50 control member 52 under the action of means of relative movement between the module 70 and the machine 10.

For preference, the first device 76 of the module 70 comprises at least one actuator 82 selectively controlling the movement of at least one cam 84 between the said rest and work positions.

In the work position, the cam 84 is intended to collaborate with the locking device 50 control member 52 to cause the locking means 58, 60 to move between the said locked and unlocked positions.

For preference, the actuator 82 of the first device 76 is an actuating cylinder, such as a hydraulic or pneumatic cylinder, which is secured to the chassis 80.

The actuator 82 comprises an actuating rod 86 the end of which is connected to the cam 84, the rod sliding in the transverse overall direction between a retracted position and a deployed position.

For preference, the cam 84 is mounted such that it can turn between the said rest and work positions.

As an alternative, the cam 84 is mounted with the ability to effect a translational movement between the said rest and work positions.

The cam 84 comprises a pivoting part which is mounted to rotate about a pivot pin A, here directed longitudinally.

The cam 84 comprises another actuating part to which the actuating rod 86 of the actuator 82 is connected.

Figure 4:
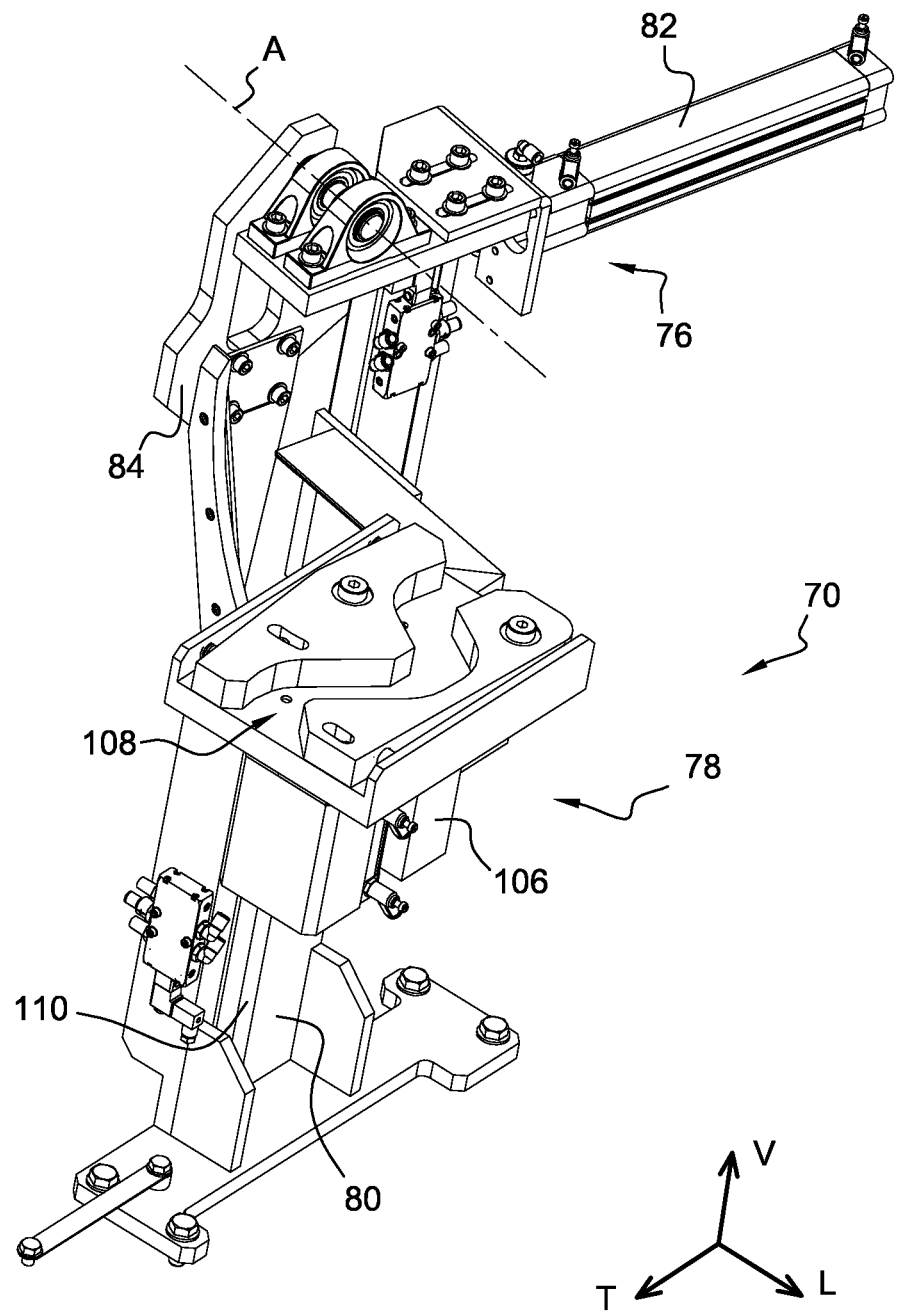
FIGS. 4 and 5 are perspective views respectively depicting a preferred embodiment of the control module according to the invention and illustrating the first device and the second actuating device that respectively bring the module into the rest position and into the work position.

Thus, it is evident notably by comparing FIGS. 4 and 5, that the pivoting of the cam 84 about the pin A from its rest position into its work position (as indicated by an arrow in FIG. 5) is achieved by operating the actuator 82 of which the sliding of the actuating rod 86 between the retracted position and the deployed position causes the said pivoting of the cam 84.

The opening device 50 control cam 84 comprises a cam profile 88 intended to collaborate with the roller that forms the control member 52.

Advantageously, the relative movement means consist of the moulding unit 24 which can be moved in relation to the fixed module 70 in a travel capable of bringing the control member 52 into collaboration with the associated first device 76 occupying its work position, until a set position, known as the mould change position, is reached.

More specifically, when the moulding unit 24 is fitted to a machine 10 of the rotary type, like the one depicted in FIG. 1, the relative movement with respect to the fixed module 70 is obtained by turning the carousel 22 in the direction of the arrow F.

Thanks to such a movement, the control member 52 of the locking device 50 formed of the roller will travel successively along the sections of the cam profile 88.

Figure 6:
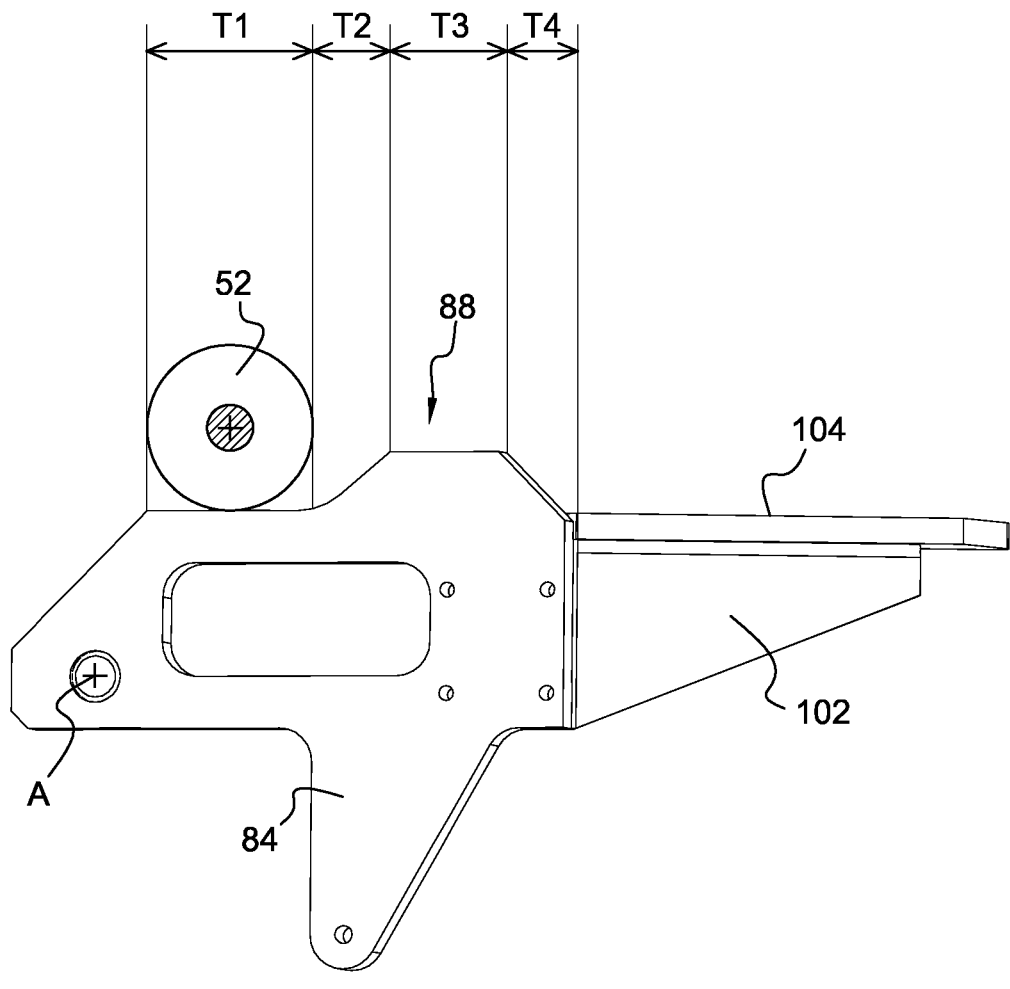
FIG. 6 is a front view depicting in detail the first cam of the first moulding unit unlocking device actuating device.

As depicted in FIG. 6, the cam profile 88 of the cam 84 comprises, in succession, at least two sections, preferably in this instance a first section T1, a second section T2 and a third section T3.

When the control member 52 travels along the straight first section T1, the locking device 50 which occupies its locked position is kept in such a position so that the first section T1 has no effect on the locking means 58, 60 drive means 62.

The first section T1 advantageously allows the control member 52 to be positioned before it starts to move along the second section T2, but as an alternative, the cam 84 has no such first section T1.

When the control member 52 travels along the second section T2 that forms an inclined ramp with a slope that climbs in the direction of travel of the control member 52, the control member 52 will therefore be moved vertically upwards, this simultaneously causing the upward sliding of the drive means 62, which sliding is accompanied by an identical movement of the locking means 58, 60, which move as one with it, and which in so doing move from the locked position into the unlocked position.

Advantageously, the second section T2 corresponds to an unlocking section which is able to act on the control member 52 to cause the locking means 50 to move from the locked position into the unlocked position.

When the control member 52 continues along the cam profile 88, it then travels along a straight third section T3 during which the unlocking force applied by the cam 84 to the control member 52 is maintained, so that the locking device 50 remains in the unlocked position in spite of the opposing force applied to the control member 52 by the elastic return means 66.

In order to keep the locking device 50 in the unlocked position, one solution is to extend the third section T3 in a straight line at least until the set position, known as the mould change position, is reached.

However, the locking device 50 may also be kept in the unlocked position using a different, preferred, solution described hereinbelow.

Specifically, it will be noted that the cam profile 88 of the cam 84 here comprises a fourth section T4.

Now, the fourth section T4 forms an inclined ramp that constitutes a descent for the control member 52 continuing its path while the carousel 22 of the machine has not stopped and the mould change position been reached.

Thus, when the control member 52 is going to run along such a section T4, that is to say to drop back down in the vertical direction, it is noted that it effects a change in level substantially identical to the one negotiated in the transition from the second section T2 to the third section T3.

As a result, the elastic return means 66 will automatically cause the drive means 62 connected to the locking means 58, 60 to slide downwards and will return the locking device 50 to the locked position.

This is why the moulding unit 24 advantageously comprises a blocking mechanism 90 which is associated with the locking device 50.

Such a blocking mechanism 90 is more particularly visible in FIGS. 7 and 8.

Advantageously, the mechanism 90 comprises blocking means 92, such as a slide, which are able to be made to move selectively between an inactive position (FIG. 7) and an active blocking position (FIG. 8).

The active blocking position corresponds to the position in which the said blocking means 92 immobilize the locking means 58, 60 in the unlocked position.

For preference, the blocking means 92 comprise a male blocking part formed of a lug 94 which is able to penetrate a complementary female part of the drive means 62 which in this instance is formed of a notch 96.

Thanks to the collaborating shapes of the lug 94 of the blocking means 92 and the notch 96 of the drive means 62, the drive means 62 are immobilized and then no longer able to slide into the locked position, regardless as to whether or not an unlocking force is applied to the control member 52.

When there is no blocking by the mechanism 90, such a return to the locked position would automatically be brought about by the elastic return means 66.

The blocking means 92 are here mounted able to move translationally in the transverse direction, that is to say at right angles to the vertical direction in which the locking means 58, 60 drive means 62 extend, between said inactive position and said active blocking position.

Advantageously, the blocking mechanism 90 comprises an elastic return member 98 that returns the blocking means 92 to the active blocking position.

Advantageously, the blocking means 92 are moved, against the action of the said elastic return member 98, from the active position to the inactive position by a control element.

For preference, the control element is formed by one of the branches 54 which is able to collaborate with a finger 100 integral with the blocking means 92 so as automatically to cause the mechanism 90 to be unblocked as the moulding unit 24 mould holders 26 close.

The finger 100 projects transversely beyond the male part formed by the lug 94 and as far as the housing delimited by the branches 56 in which housing the branch 54 is intended to be accommodated in the closed position, the end of the said branch 54 then collaborating with the end of the said finger 100 so as to cause the blocking means 92 to slide transversely from the active blocking position to the inactive position and do so against the action of the elastic return member 98.

As a result, as soon as the mould holders 26 begin to open, when the branch 54 disengages from between the branches 56 and no longer acts on the finger 100, the blocking means 92 are automatically returned to the active blocking position in which the lug 94 inserted in the notch 96 immobilizes the locking means 58, 60 in the unlocked position.

As will have been appreciated, the relative movement between the machine 10 carrying the moulding unit 24 and the first device 76 of the module 70, the command to open the moulding unit 24 using the second device 78 and the cam profile 88 are advantageously synchronized.

Advantageously, the relative position of the cam 84 with respect to the machine and to the second device 78 is carefully chosen and the cam profile 88 is shaped in such a way that, when the control member 52 leaves the third section T3 to begin the fourth section T4, the locking means 58, 60 become blocked in the unlocked position by the mechanism 90.

Because special attention is also devoted to operator safety, it must be pointed out that the blocking means 92 are capable of disengaging, for example if the elastic return member 98 breaks or if the operator inadvertently actuates the finger 100.

In the latter instance, if an operator mistakenly applies enough force to the finger 100, the lug 94 can disengage from the notch 96, the drive means 62 and the locking means 58, 60 secured thereto would then be immediately returned to the locked position by the elastic return means 66.

However, such sudden sliding of these means of the locking device 50 represents certain danger to an operator intervening on the moulding unit 24 and could cause serious injury.

Advantageously, the first device 76 comprises a bracket 102 which moves as one with the cam 84 to which it is attached with fixings, for example by screwing.

The bracket 102 comprises a horizontal part that has a flat abutment face 104 which follows on from the fourth section T4 so that, in the event of inadvertent unblocking, the support 68 of the locking device 50 control member 52 will butt against the said face 104 in order immediately to be halted in its travel without ever reaching the locked position.

Of course, the description just given of the preferred embodiment is given solely by way of nonlimiting example.

Accordingly, the cam profile 88 and the cam 84 of the first device 76 are dependent on the type of locking device 50 that the moulding unit 24 comprises.

Thus, as mentioned previously, the locking device 50 could equally have no blocking mechanism 90, just as it could have no elastic return means 66.

Furthermore, the presence or absence of a blocking mechanism is independent of the presence or absence of elastic return means 66 for returning the locking device locking means.

According to an alternative form that has not been depicted, the locking device 50 has no elastic return means 66 and the first device 76 is able, for example using a cam 84, to actuate the control member 52 to cause the locking means 58, 60 to move between the locked and unlocked positions.

In such an alternative form, the first device 76 is therefore able selectively to cause the locking device 50 locking means 58, 60 to move towards one or other of the said locked and unlocked positions.

In such an alternative form, the first device 76 may have no blocking mechanism or alternatively may have such a blocking mechanism to immobilize the locking means and do so in one and/or other of the said locked and unlocked positions.

According to another alternative form that has not been depicted, the first device 76 comprises or does not have a blocking mechanism and elastic return means are incorporated in such a way as automatically to return the locking means 58, 60 to the unlocked position (rather than to the locked position).

Once the locking means 58, 60 are in the said unlocked position, it is then possible to continue with opening the moulding unit 24 so as to gain access to the mould that is to be changed.

To do this, the module 70 comprises the second device 78 intended selectively to actuate the moulding unit 24 opening and closing device 46.

Advantageously, the second device 78 is mounted such that it can move between:
- a rest position occupied when the module 70 is in the standby state, and
- a work position occupied when the module 70 is in the service state.

In the work position illustrated in FIG. 5, the second device 78 is able to collaborate with the opening/closing device 46 control member 48 under the action of means of relative movement between the module 70 and the machine 10.

The second device 78 of the module 70 comprises at least one actuator 106 selectively causing at least one cam 108 to move between the said rest and work positions.

Advantageously, the cam 108 collaborates with the moulding unit 24 opening/closing device 46 control member 48 in order to cause the mould holders 26 to move between the said open and closed positions.

For preference, the cam 108 is mounted such that it can move translationally between the said rest and work positions.

As an alternative, the cam 108 is mounted such that it can move rotationally between the said rest and work positions.

The second device 78 is carried by the chassis 18 which comprises sliding means 110, such as one or two slideways, so that the actuator 106 causes the movement, here in vertical sliding, of the said cam 108 between the raised or lowered position.

Advantageously, the opening and closing device 46 control cam 108 has a cam profile 112 which has at least a section TO and a section TF that respectively make the moulding unit 24 mould holders 26 open and close.

The cam 108 comprises a camway 112 which is delimited by the profile 112A of a first component 114 and by the profile 112B of a second component 116.

Advantageously, the components 114 and 116 are mounted such that they can move on a mounting plate 118 having, in longitudinal section, a U-shaped profile formed of a bottom 120 and of two flanges 122 and 124 these respectively being a front flange and a rear flange.

Each component 114, 116 is thus mounted such that it can pivot about a shaft 126 that forms an axis of rotation and does so in this instance against the action of elastic members such as springs 128.

For preference, the first component 114 is mounted such that it can pivot about a shaft 126 arranged at one of its transverse ends and against the action of a spring 128 arranged at the other end and interposed between the vertical flange 124 of the mounting plate 118 and one edge of the component 114.

The second component 116 is mounted such that it can pivot against the action of two springs 128 positioned between the vertical flange 122 of the mounting plate 118 and one edge of the component 116.

The travel of each of the said components 114, 116 is advantageously limited by stop means, realized for example by the collaboration between a peg 130 secured to the bottom of the mounting plate 118 and which is able to travel along a complementary slot 132 that each component 114, 116 comprises.

Thanks to such a design of cam 108, the risks of the control member 48 jamming when travelling along the camway 112 in are particular limited.

Figure 9:
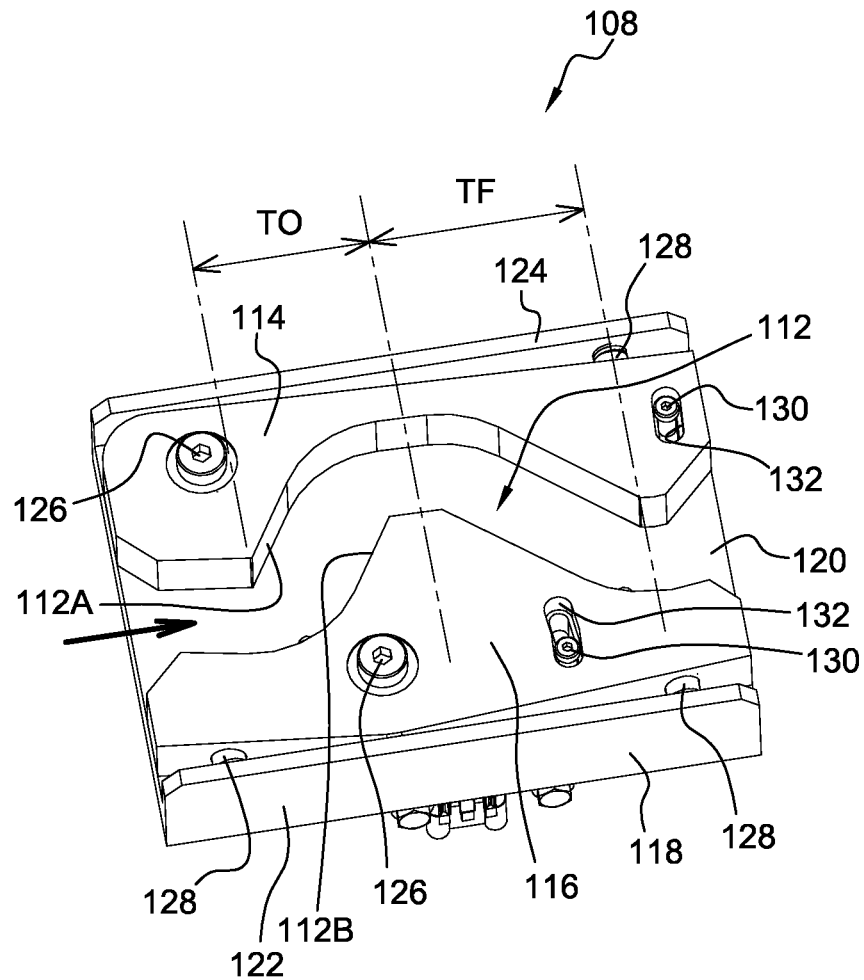
FIG. 9 is a plan view depicting in detail the second cam of the second moulding unit unlocking device actuating device.

The camway 112 is travelled by the opening/closing device 46 control member 48 in the direction of the arrow indicated in FIG. 9.

Advantageously, the entrance is chamfered to make it easier for the lower roller of the control member 48 to enter the camway 112 which has a first section followed by the section TO corresponding to the command to open the moulding unit 24 mould holders 26.

In addition, the camway 112 comprises a section TF corresponding to the command to close and which occurs after the opening and changing of the mould of the moulding unit 24, when the carousel 22 of the machine 10 is turned to discharge (the contents of) the moulding unit 24 that has been used and bring the next moulding unit 24 into position so that the mould change can also be performed.

The set position, known as the mould change position, corresponds to the median position occupied by the control member 48 in the camway 112 when it is at the junction between the sections TO and TF.

Advantageously, the camway 112 is designed in such a way that, when the said set position is reached, the mould holders are opened so that they subtend the maximum angle so as to facilitate access to the mould.

Advantageously, the actuators 82 and 106 of the first device 76 and of the second device 78 constitute control means for commanding the change of state of the module 70 between the standby and use states.

Advantageously, the module 70 is arranged in a rear part of the machine 10, diametrically opposite the said front part that comprises the aforementioned introduction and discharge zones, the rear part comprising for example an installation zone ZO which is hatched in FIG. 1 and in which the module 70 can be mounted.

Advantageously, doors for accessing the said intervention zone Z3 comprising the module 70 according to the invention are provided in the enclosure 30.

In the case of a machine 10 of the rotary type as illustrated in FIG. 1, the carousel 22 is turned by motorized drive means (not depicted) controlled by a control unit.

When the machine is in the mode of operation known as the production mode, used for the manufacture of containers by the machine, the output of the machine is thus determined by the rate at which the machine rotates.

In a machine according to the prior art, the rotation of the carousel is stopped either by stopping the motorized drive means, the carousel then eventually stopping of its own accord after a given time span, or by stopping the motorized drive means and actuating braking means associated with the carousel so that the machine can be rapidly brought to a standstill.

In the prior art and to effect a mould change, the moulding unit 24 was hitherto brought into the desired intervention zone by the operator who made the carousel turn in successive pulses until the desired moulding unit of the series is approximately positioned in the said intervention zone.

According to another feature, the invention also proposes a method for controlling the rotation of the machine in the mode of operation known as the intervention mode and which is intended for implementing a change of mould and associated with the standby state of the control module 70.

Figure 10:
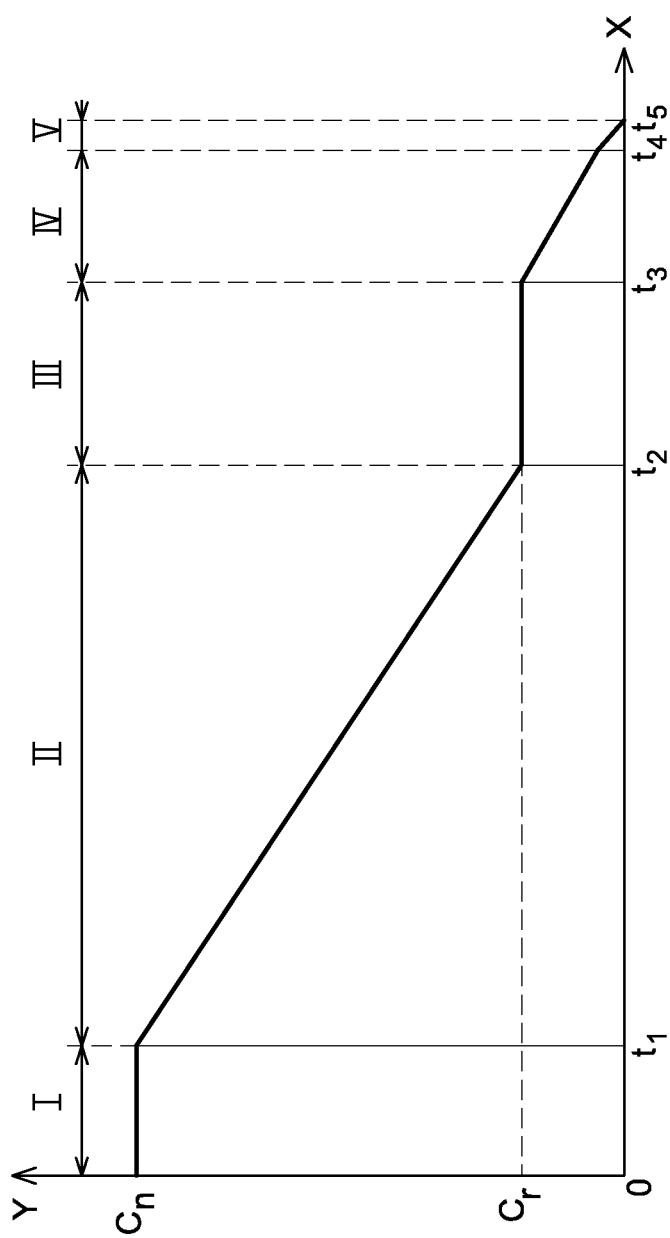
FIG. 10 is a graph the curve of which represents the various steps of a method of controlling the machine of which the carousel, the carrying the moulding units and turned, advantageously constitutes the means of relative movement.

FIG. 10 depicts a graph illustrating the change in rate on the ordinate axis (Y) as a function of time on the abscissa axis (X) when the said control method is implemented.

Advantageously, the control method is described hereinafter on the assumption that the machine 10 is initially in the mode of operation known as the production mode for manufacturing containers.

Starting out from this state, the machine 10 is then rotated at a set nominal rate Cn, for example a production rate of 40 000 containers per hour.

The nominal rate Cn corresponds to the first portion "I" of the curve extending from zero up to the time $t_1$ as depicted in FIG. 10.

Advantageously, the machine comprises a variator which is associated with the motorized drive means and driven by the control unit. The variator is notably intended to manage the variations in rate, by virtue of which the said variations take place preferably in a way that is linear over time.

The control method comprises successive steps of which a first step (a) consists in commanding the deceleration of the carousel of the machine 10 from a nominal rate Cn until it reaches a rate known as the reduced rate Cr.

To do this, the control unit controls the carousel drive means and the variator in such a way as to slow the carousel which, over the span of time from $t_1$ to $t_2$, decreases linearly along the rectilinear ramp illustrated in the second portion "II" of the curve.

Thus, in the first step (a), the machine is slowed down using only the drive means and the associated variator, the linear deceleration ramp being programmed into the control unit of the machine.

The reduced rate Cr is, for example, a rate of approximately 10 000 containers per hour.

In a container manufacturing machine 10, the various circumferentially distributed moulding units 24 are advantageously all identified, for example by a number: 1, 2, 3 etc. according to the total number of units in the series.

Such identification advantageously makes it possible to set up traceability during the mode of operation, known as the production mode, of the machine.

As a result of this traceability it is notably possible to determine which moulding unit 24 is implicated when problems, such as manufacturing defects, occur affecting the containers.

Thus, each of the moulding units 24 in the series that the machine 10 comprises is identified, as also is the mould that it comprises.

The second step (b) of the control method involves bringing the first moulding unit 24 of the series to the intervention zone at the reduced rate Cr.

The second step (b) corresponds to the third portion "III" of the curve of FIG. 10, which lies between the times $t_2$ and $t_3$.

Advantageously, the reduced rate Cr is chosen to be high enough that the duration of the second step (b) is optimized, particularly if the said first moulding unit 24 has to make almost an entire turn of the carousel.

When the first moulding unit 24 approaches the said intervention zone in which the module 70 according to the invention is installed, a third step (c) is then implemented.

The third step (c) of the control method consists in once again commanding a deceleration of the carousel of the machine 10 from the rate known as the reduced rate Cr down to a set threshold rate.

Like in step (a), the deceleration is obtained by preferably acting only on the motorized drive means and the variator of the machine 10.

The third step (c) corresponds to the fourth portion "IV" of the curve of FIG. 10 implemented between the times $t_3$ and $t_4$.

Advantageously, the linear deceleration ramp which is programmed into the control unit of the machine for the second deceleration is performed with feedback control on the position of the first moulding unit 24.

When the third step (c) is being implemented, the first moulding unit 24, which rotates about the carousel in the direction of the arrow F, always lies ahead of the said intervention zone and, because of the feedback control on position, its relative position on the carousel at each moment t is known.

Thus, when the first moulding unit 24 is approaching the said zone, a fourth step (d) according to the control method is implemented.

The fourth step (d) involves actuating the braking means of the machine 10 so as to cause the first unit to stop in a set final position which is situated ahead of the control module 70.

The fourth step (d) corresponds to the fifth portion "V" of the curve, lying between the times $t_4$ and $t_5$, and during which the braking means reduce the rate from the threshold rate down to a zero rate corresponding to the machine reaching a standstill when the first moulding unit is in the said set final position.

Advantageously, thanks to the feedback control on the position, it is possible to determine precisely said final position in which the first moulding unit 24 reaches a standstill.

In this respect, it will be recalled that, for a rotary machine 10, the distance between two consecutive moulding units 24 is generally known as the pitch and that the pitch P is dependent on the number of moulding units in the series which are uniformly angularly distributed over the 360° of the circumference of the carousel.

For preference, the final position is determined so that it is approximately half a pitch of the machine 10 away from the control module 70.

A fifth step (e) consists in actuating the control module 70 in such a way as to go from the standby state hitherto occupied into the use state.

The use state of the control module 70 is associated with the mode of operation, known as the intervention mode, of the machine 10 and is intended at least for the changing of the mould of the first moulding unit.

The use state of the module 70 is obtained as a result of the first actuating device 76 that actuates the locking device 50 and the second actuating device 78 that actuates the moulding unit opening/closing device having respectively been moved from their rest position corresponding to the standby state of the module 70 into their work position corresponding to its use state.

More specifically, according to the preferred embodiment described hereinabove with reference to FIGS. 1 to 9, the actuator 82 of the first device 76 of the module 70 is operated in such a way as to cause the cam 84 to pivot, about the axis A, from the rest position illustrated in FIG. 4 into the work position illustrated in FIG. 5.

In the work position, the cam 84 exhibiting the cam profile 88 is then able to collaborate with the locking device 50 control member 52 under the action of the relative-movement means.

Likewise, the actuator 106 of the second device 78 of the module 70 is operated to cause the cam 108 to slide vertically upwards, from its rest position illustrated in FIG. 4 into its work position illustrated in FIG. 5.

In the work position, the cam 108 is then able to collaborate with the moulding unit opening/closing device 46 control member 48 under the action of the relative-movement means.

When, following the fifth step (e), each of the first and second devices 76, 78 of the control module 70 have reached the work position, a sixth step (f) is then performed.

The sixth step (f) consists in controlling the motorized drive means in order to rotate the carousel of the machine 10 in the direction of the arrow F in order to move the first moulding unit 24 from the set final position into a set position, known as the mould change position, situated beyond the control module 70.

Advantageously, the relative-movement means in fact consist of the moulding unit 24 which is able to be moved with respect to the fixed module 70 over a specific distance so as to bring each of the control members 48 and 52 into collaboration with the actuating means 84, 108 of the associated devices 76, 78 occupying its work position.

The first moulding unit 24 thus covers a first part of a travel, here preferably corresponding to half a pitch, to reach the control module 70 and then, from the module 70, continues and effects a second part of travel until it reaches a set position, known as the mould change position.

For preference, the second part of the travel of the first moulding unit 24 is equal to the pitch P, that is to say to the distance between two consecutive moulding units 24 of the machine 10 so that when the first moulding 24 has reached the mould change position, the second moulding unit that follows it at a spacing equal to the pitch P coincides with the devices 76 and 78 of the control module 70.

When the first moulding unit 24 reaches the said set mould change position, the turning of the carousel is halted, for example by actuating the braking means, so as to immobilize the said first moulding unit 24 in the mould change position.

A seventh step (g) of the control method therefore consists in stopping the first moulding unit 24 in the said mould change position.

The operations of removing the mould of the first moulding unit 24 and of fitting a new mould are then carried out.

Once the mould change on the first moulding unit 24 has been completed, an eighth step (h) similar to the sixth step (e), from which it differs only in the distance covered, is then performed.

The eighth step (h) of the control method consists in causing the carousel to turn to cover a set distance equal to the pitch P and in immobilizing the carousel after the said distance has been covered.

Advantageously, with the set distance being equal to the pitch P of the machine 10, the first moulding unit 24 is offset by one pitch P beyond the mould change position and the second moulding unit one pitch P away becomes positioned in the said set mould change position while the third moulding unit for its part becomes positioned facing the control module 70.

The second moulding unit 24 is therefore immobilized in turn in the mould change position in which the mould holders 26 are in the open position to permit access to the mould that has to be changed.

The mould of each moulding unit 24 of the machine 10 is thus changed in succession.

As an alternative, the distance covered differs from the length of the pitch P, for example when only every second moulding unit needs to have its mould changed.

According to an alternative form of embodiment that has not been depicted, the relative-movement means consist of the module 70 which is mounted such that it can move with respect to the moulding unit 24 occupying a fixed set position.

Advantageously, the module 70 is then able to be moved by drive means from:
 a retracted position corresponding to the rest position of the first and second devices 76, 78 into
 a forward position corresponding to the work position of the first and second devices 76, 78.

Proceeding in this manner, the first and second devices 76, 78 are made to collaborate with the control members 48 and 52 which respectively control the locking device 50 and the opening/closing device 48 until a set position known as the mould change position is reached.

Advantageously, the means of driving the module 70 between the said retracted and forward positions then constitute means of controlling the change of state of the module 70 between the standby and use states.

For preference, the module 70 is produced in the form of a motorized carriage which is able to be made to move between the said retracted and forward positions.

The invention claimed is:

1. Machine (10) for the manufacture of containers, notably bottles, made of thermoplastic, comprising at least one moulding unit (24) which comprises at least two mould holders (26) mounted such that they can move between an open position and a closed position, and a mould comprising at least two moulding elements (72) each fixed removably to an associated mould holder (26) by fixing means, the said moulding unit (24) comprising:
   a moulding unit (24) opening/closing device (46) comprising a control member (48) for moving the mould holders (26) between the said open and closed positions;
   a moulding unit (24) locking device (50) comprising a control member (52) for controlling the locking means (58, 60) which are able to move between:
   a locked position in which the mould holders (26) of the moulding unit (24) are kept in a closed position by the said locking means (58, 60), and
   an unlocked position in which the mould holders (26) are free to be parted from the closed position to the open position
characterized in that the machine (10) comprises a control module (70) able to occupy at least:
   a standby state associated with one mode of operation of the machine (10), known as the production mode, in which the machine manufactures containers, and
   a state of use associated with another mode of operation of the machine (10), known as the intervention mode, in which at least the mould of the moulding unit (24) can be changed,
and able selectively to control the moulding unit (24) locking device (50) and opening/closing device (46) according to the state occupied by the module (70), the said module (70) comprising at least:
   a first device (76) intended selectively to actuate the moulding unit (24) locking device (50) and mounted able to move between:
   a rest position occupied when the module (70) is in the standby state, and
   a work position occupied when the module (70) is in the state of use and in which the first device (76) is able to collaborate with the locking device (50) control member (52) under the action of means causing relative movement between the module (70) and the machine (10),
   a second device (78) intended selectively to actuate the moulding unit (24) opening/closing device (46) control member (48) and which is mounted such that it can move between:
   a rest position occupied when the module (70) is in the standby state, and
   a work position occupied when the module (70) is in the service state and in which the second device (78) is able to collaborate with the opening/closing device (46) control member (48) under the action of means causing relative movement between the module (70) and the machine (10),
   and a chassis (80) supporting said first and second devices (76, 78) of the module (70).

2. Machine according to claim 1, characterized in that the means of relative movement consist of the moulding unit (24) which can be moved with respect to the fixed module (70) along a travel capable of bringing each control member (48, 52) into collaboration with the associated device (76, 78) occupying its work position until a set position, known as the mould change position, is reached.

3. Machine according to claim 2, characterized in that the first device (76) of the module (70) comprises at least one actuator (82) selectively controlling the movement of at least one cam (84) between the said rest and work positions, the said cam (84) collaborating with the locking device (50) control member (52) to cause the locking means (58, 60) to move between the said locked and unlocked positions.

4. Machine according to claim 3, characterized in that the locking device (50) control cam (84) comprises a cam profile (88) that has at least one unlocking section (T2) to cause the locking means (58, 60) to move into the unlocked position.

5. Machine according to claim 3, characterized in that the locking device (50) comprises elastic return means (66) able automatically to return the locking means (58, 60) to the locked position.

6. Machine according to claim 4, characterized in that the moulding unit (24) comprises a blocking mechanism (90) associated with the locking device (50), the said mechanism (90) comprising blocking means (92) able selectively to be made to move between an inactive position and an active blocking position in which the said blocking means (92) immobilize the locking means (58, 60) in the unlocked position.

7. Machine according to claim 6, characterized in that the blocking mechanism (90) comprises an elastic return member (98) for elastically returning the blocking means (92) to the active position, and in that the blocking means (92) are moved, against the action of the said elastic return member (98), from the active position to the inactive position by a control element (54) which, connected with one of the mould holders (26), is able to collaborate with the blocking means (92) in such a way as automatically to cause unblocking upon closure of the mould holders (26) of the moulding unit (24).

8. Machine according to claim 3, characterized in that the second device (78) of the module (70) comprises at least one actuator (106) selectively controlling the movement of at least one cam (108) between the said rest and work positions, the said cam (108) collaborating with the unit opening/closing device (46) control member (48) to cause the mould holders (26) to move between the said open and closed positions.

9. Machine according to claim 8, characterized in that the actuators (82, 106) of the first device (76) and of the second device (78) constitute means for controlling the change of state of the module (70) between the standby and use states.

10. Machine according to claim 1, the said machine (10) of rotary type comprising a carousel (22) circumferentially provided with a series of uniformly angularly distributed moulding units (24), each of the units travelling a circular overall path from a preform (14) introduction zone (Z1) to a container (14') discharge zone (Z2), the zones being situated respectively in a front part of the machine (10),
   characterized in that the module (70) is arranged in a rear part (Z3) of the machine (10) which is diametrically opposite the said front part.

11. Machine according to claim 5, characterized in that the moulding unit (24) comprises a blocking mechanism (90) associated with the locking device (50), the said mechanism (90) comprising blocking means (92) able selectively to be made to move between an inactive position and an active blocking position in which the said blocking means (92) immobilize the locking means (58, 60) in the unlocked position.

12. Machine according to claim 11, characterized in that the blocking mechanism (90) comprises an elastic return member (98) for elastically returning the blocking means (92) to the active position, and in that the blocking means (92) are moved, against the action of the said elastic return member (98), from the active position to the inactive position by a control element (54) which, connected with one of the mould holders (26), is able to collaborate with the blocking means (92) in such a way as automatically to cause unblocking upon closure of the mould holders (26) of the moulding unit (24).

13. Machine according to claim 1, characterized in that the second device (78) of the module (70) comprises at least one actuator (106) selectively controlling the movement of at least one cam (108) between the said rest and work positions, the said cam (108) collaborating with the unit opening/closing device (46) control member (48) to cause the mould holders (26) to move between the said open and closed positions.

* * * * *